United States Patent Office 3,641,006
Patented Feb. 8, 1972

3,641,006
PROCESS FOR THE PREPARATION OF STEROID
α-FLUORONITRIMINES
William Charles Ripka, Wilmington, Del., assignor to E. I.
du Pont de Nemours and Company, Wilmington, Del.
No Drawing. Filed June 1, 1970, Ser. No. 42,558
Int. Cl. C07c 173/00
U.S. Cl. 260—239.55 C                                                 6 Claims

ABSTRACT OF THE DISCLOSURE

Nitrosyl tetrafluoroborate reacts with certain steroids having carbon-carbon double bonds to give the corresponding steroid α-fluoronitrimines. Use of a mixture of nitrosyl fluoride with nitrosyl tetrafluoroborate considerably improves the yield of α-fluoronitrimines over that obtained with either nitrosyl fluoride or nitrosyl tetrafluoroborate alone. The steroid α-fluoronitrimines, produced by this process, are intermediates to biologically active products, which have a broad range of hormonal activities.

BACKGROUND OF THE INVENTION

Field of the invention

This invention relates to an improved process for the preparation of steroid α-fluoronitrimines.

Prior art

It is known that nitrosyl fluoride adds to certain steroid double bonds, giving the corresponding α-fluoronitrimines. Such reactions are disclosed, for instance, in U.S. Pats. 3,219,673 (to Boswell) and 3,320,921 (to Andreades) as well as in several publications; cf. Boswell, Chem. & Ind., 1965, 1929; J. Org. Chem. 31, 991 (1966) and 33, 3699 (1968); and Gratz et al. Steroids 14, 729 (1969).

The α-fluoronitrimine products can be hydrolyzed to the corresponding steroid α-fluoroketones, which are valuable either per se or as starting materials for the preparation of unsaturated gem-difluoro compounds.

SUMMARY OF THE INVENTION

It has now been discovered, according to this invention, that the efficiency of the addition of nitrosyl fluoride to steroid carbon-carbon double bonds is often considerably improved when nitrosyl tetrafluoroborate also is present in the reacting mixture. Nitrosyl tetrafluoroborate can, if desired, be formed in situ by adding boron trifluoride to nitrosyl fluoride. Nitrosyl fluoroborate alone also can be used and leads to the same products.

DETAILED DESCRIPTION OF THE INVENTION

The process of this invention can be illustrated by the following equation, in which

represents a steroid double bond.

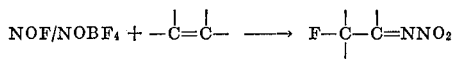

The nitrimino group is readily hydrolyzed to the ketone by, e.g., Grade III alumina.

Suitable steroids which can be used as starting materials in the present process include 2-estrenes, 5-estrenes, 2-androstenes, 9(11)-androstenes, 16-estrenes, 16-androstenes, 13β-ethyl-5-gonenes, 5-pregnenes, and 9(11)-pregnenes. The starting steroids can bear substituents which are unreactive under the process conditions. These substituents, which can be attached either to ring carbons or to exocyclic carbons, include hydrocarbon radicals (preferably lower alkyl or lower alkynyl), ketone, ether, and ester groups, or halogen atoms. "Lower alkyl" is a $C_1$–$C_6$ alkyl and includes methyl, ethyl, propyl, butyl, pentyl, and hexyl, together with their branched isomers. "Lower alkynyl" includes ethynyl, 1-propylnyl, 2-propynyl, and all butynyl isomers.

The 2-estrenes and 2-androstenes that can be used as starting materials include compounds have the Formula 1, below,

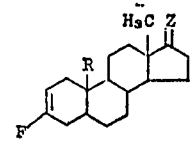

(1)

in which R is hydrogen or methyl; Z is oxygen or

$R^1$ being hydrogen, methyl, or ethynyl, and $R_2$ being alkanoyl of at most 8 carbons. Such steroids include, for example, 3-fluoro-2-estren-17-one, 17β - acetoxy - 17α-ethynyl-3-fluoro-2-estrene, 17β-butyryloxy - 17α - methyl-3-fluoro - 2 - androstene, and 3 - fluoro - 2 - androsten-17-one. This 3,3-difluoro-2-nitrominosteroids produced in this step can be hydrolyzed to the corresponding 3,3-difluoroestran-2-ones and 3,3-difluoroandrostan - 2 - ones which either have themselves hormonal activity or are intermediates to hormonally active compounds, such as androgens, antiandrogens, or antiestrogens. These biological properties are discussed in detail in the copending application of William C. Ripka, Ser. No. 869,352, filed Oct. 24, 1969.

3-fluoro-2-androstene-17-one is thus converted to 3,3-difluoro - 2 - nitriminoandrostan-17-one, which can be hydrolyzed with wet alumina to 3,3-difluoroandrostan-2,17-dione. This last steroid compound has antiandrogen activity comparable with that of progesterone.

Operable 5-estrenes include compounds having the following Formula 2, below,

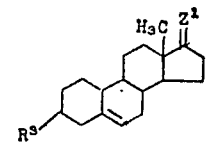

(2)

in which $R^3$ is a $C_1$–$C_6$ alkanoyloxy or benzoyloxy group; and $Z^1$ is oxygen, $F_2$,

$R^4$ being $OCOCH_3$, $OCOCH_2CH_3$, $CF_2CH_3$, $COCH_3$, or $COCH_2F$; and $R^5$ being H, $OCOCH_3$, $OCOCH_2CH_3$, $CH_3$, or C≡CH. 3-acetoxy-5-estren-17-one and 17-acetyl-3-propionyloxy-5-estrene are representative of this group. As described in U.S. 3,219,673, the 5-fluoro-6-nitrimino steroid products obtained by addition of NOF are useful as intermediates in the preparation of biologically active steroids.

Suitable 13β-ethyl-5-gonenes include 3β,17β-diacetoxy-13β-ethyl-5-gonene, the compound of Formula 3

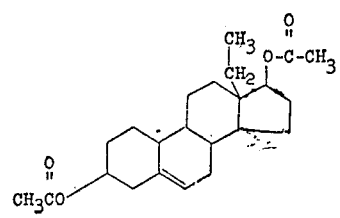

(3)

as well as similar 3β,17β-diesters other than diacetates.

3β,17β-diacetoxy-13β-ethyl-5-gonene, treated with an NOF/NOBF₄ mixture yields 3β,17β-diacetoxy-5α-fluoro-13β-ethylgonan-6-nitrimine, which can be hydrolyzed to the corresponding 6-ketone; fluorinated with SF₄ to the 5α,6,6-trifluorosteroid; hydrolyzed to the 3β,17β-dihydroxysteroid; oxidized to the 3,17-dione; dehydrofluorinated in the C₄–C₅ positions; ketalized in the C₃ position; ethynylated in the 17α-position; and hydrolyzed to 6,6-difluoro-13β-ethyl-17β-hydroxy-17α-ethynyl - 4 - gonen-3-one.

This compound can be esterified in the 17β-position to give steroid compounds having useful hormonal activity. Thus, e.g., 6,6-difluoro-13β-ethyl-17α-ethynyl-17β-enanthoyloxy-4-gonen-3 - one has antiestrogenic activity about five to ten times higher than that of progesterone. This compound is disclosed in the copending application of A. L. Johnson, Ser. No. 877,495, filed Nov. 17, 1969, and assigned to the same assignee.

Suitable 9(11)-androstenes include compounds having the Formula 4, below,

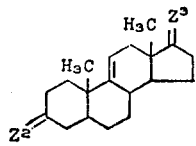

(4)

in which $Z^2$ is oxygen or

$R^6$ being a $C_1$–$C_6$ alkanoyloxy group, preferably acetoxyl, and $R^7$ being hydrogen; or $R^6$ and $R^7$ taken together being ethylenedioxy (—OCH₂CH₂O—); and $Z^3$ is

$R^8$ being a $C_1$–$C_6$ alkanoyloxy group, preferably acetoxyl, or 1-($C_1$–$C_6$ alkanoyl)oxyethyl, preferably 1-acetoxyethyl; and $R^9$ being hydrogen or methyl. Representative examples of this class are 17β-acetoxy-17α-methylandrost-9(11)-en-3-one and 3β-acetoxy-17β-(1-acetoxyethyl)androst-9(11)-ene. The 9-fluoroandrostan-11-one derivatives produced after hydrolysis of the 9-fluoro-11-nitriminoandrostane products have androgenic, anabolic, or antiandrogenic activity, or are intermediates to compounds having such activity. See, for example, Lyster et al., Endocrinology, 58, 781 (1956).

Suitable 16-estrenes and 16-androstenes include compounds having the Formula 5, below,

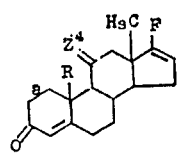

(5)

in which *a* is a single bond or a double bond; R is hydrogen or methyl; and $Z^4$ is two hydrogen atoms or oxygen. Examples are 17-fluoro-4,16-estradien-3-one, 17-fluoroandrosta-1,4,16-trien-3-one and 17-fluoroandrosta-4,16-dien-3,11-dione. The 17,17-difluoro-16-ketosteroids, produced by hydrolysis of the 17,17-difluoronitriminosteroid products, are useful an antiandrogens. Their biological properties are described in detail in the co-pending application of William C. Ripka, Ser. No. 853,922, filed Aug. 28, 1969.

Thus, 17,17-difluoro-4-estren-3,16-dione, obtained by hydrolyis of 17,17 - difluoro-16-nitrimino-4-estren-3-one (the latter made from 17-fluoro-4,16-estradien-3-one) has antiandrogenic activity comparable to that of progesterone. Similarly, 17,17-difluoro-1,4-androstadien-3,16-dione, obtained from 17-fluoro-1,4,16-androstatrien-3-one via the nitrimino compound, has antiandrogenic actvity of about the same magnitude as that of progesterone.

Suitable 5-pregnenes include compounds having the Formula 6, below

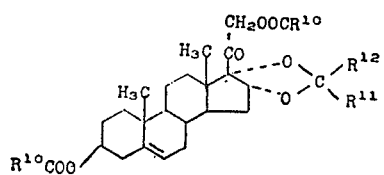

(6)

in which $R^{10}$ is $C_1$–$C_5$ alkyl; $R^{11}$ and $R^{12}$ are each individually $C_1$–$C_6$ alkyl, $C_5$–$C_6$ cycloalkyl, or phenyl; but $R^{11}$ and $R^{12}$ taken together can be tetramethylene or pentamethylene. The 5-fluoropregnen-6-ones resulting after hydrolysis of the nitrimino group are useful as intermediates in the preparation of antiinflammatory and glucocortical agents, as more fully described in the copending application of William C. Ripka, Ser. No. unknown, attorney's docket No. CR 6880-B, filed Apr. 22, 1970. Thus, for instance, 3β,16α,17α,21 - tetrahydroxy-5-pregnen-20-one 3,21-diacetate 16,17-acetonide (Formula 6; $R^{10}$ is $CH_3$; each of $R^{11}$ and $R^{12}$ is methyl) can be converted in several steps to 6,6-difluoro-16α,17α,21-trihydroxy-4-pregnen-3,20-dione 16,17-acetonide, which gives by microbiological hydroxylation in the 11-position a steroid having antiinflammatory activity. The first step in this preparation is the formation of the 5α-fluoro-6-nitriminosteroid.

Suitable 9(11)-pregnenes include compounds having the Formula 7, below,

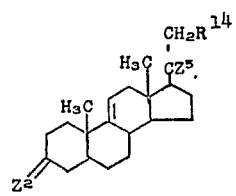

(7)

in which $Z^2$ is defined as in Formula 4; $Z^5$ is oxygen or

$R^{13}$ being a $C_1$–$C_6$ alkanoyloxy group, preferably acetoxyl; and $R^{14}$ is hydrogen or a $C_1$–$C_6$ alkanoyloxy group, preferably acetoxyl. Examples include 3β-acetoxy-9(11)-pregnen - 20 - one, 17β,21 - diacetoxy - 9(11) - pregnen-3,20-dione, and 3β,20-diacetoxy-9(11)-pregnene. The 9-fluoropregnan-11-ones produced by hydrolysis of the nitrimino group are useful as antiinflammatory agents or as intermediates in the synthesis of such agents; cf. Fried et al., J. Am. Chem. Soc., 77, 1068 (1955).

The reaction of either nitrosyl tetrafluoroborate or a mixture of nitrosyl tetrafluoroborate with nitrosyl fluoride with suitable steroids having carbon-carbon double bonds is accomplished by contacting the reactants in an aprotic solvent at a temperature within the range of about −30 to +60° C. for a period of about 3 to 240 hours. The reaction can be run at atmospheric pressure, autogenous pressure, or a higher superatmospheric pressure. The preferred temperature range is about 0°–25° C.; the usual reaction time at atmospheric pressure is about 4–24 hours.

The reaction is run in an aprotic solvent, such as methylene chloride or glycol dimethyl ether (glyme), or mixtures thereof. Suitable alternative aprotic solvents, which can be used alone or in mixtures, include ethers, such as dioxane and diglycol dimethyl ether (diglyme); halogenated paraffins, such as chloroform, carbon tetrachloride, and ethylene dichloride; aliphatic nitriles such as acetonitrile and propionitrile; sulfolane and nitromethane.

Under comparable conditions, the reaction with a mixture of NOF and NOBF$_4$ usually gives a higher yield of α-fluoronitriminosteroid than the reaction with either NOF or NOBF$_4$ alone. It is believed that NOBF$_4$ alone is a more efficient reagent than NOF, and that in the presence of NOF, more NOBF$_4$ is regenerated. This reaction sequence can be illustrated by the following equations:

$$2\text{NOBF}_4 + -\overset{|}{\text{C}}=\overset{|}{\text{C}}-\text{H} \xrightarrow{(1)} \text{F}-\overset{|}{\underset{|}{\text{C}}}-\overset{|}{\text{C}}=\text{NNO}_2 + 2\text{BF}_3 + \text{HF}$$

$$\text{NOF} + \text{BF}_3 \xrightarrow{(2)} \text{NOBF}_4$$

However, applicant does not wish to be bound by any specific theory. It is to be noted from the first equation, above, that at least one hydrogen atom must be initially attached to one of the double bond carbon atoms.

Because of this regeneration of NOBF$_4$, a relatively small amount of the starting NOBF$_4$ is sufficient. Theoretically, two moles of NOBF$_4$ are required for each mole of the unsaturated steroid to produce an α-fluoronitriminosteroid, and usually 2–10 moles of the reactant are used. When a mixture of NOBF$_4$ with NOF is employed, the amount of NOBF$_4$ can be reduced to as little as 0.1 mole per mole of steroid. In practice, about 0.5–3 moles of NOBF$_4$ and 2–8 moles of NOF are used. The reaction can also be carried out with a mixture of NOF and BF$_3$, NOBF$_4$ being generated in situ.

Formation of nitrimines by a reaction of NOBF$_4$ alone with carbon-carbon double bonds has not been heretofore reported and also is deemed to be part of this invention.

The procedure for hydrolyzing steroid α-fluoronitrimines to the corresponding α-fluoroketones with hydrated alumina is described in detail in U.S. Pats. 3,219,673 and 3,320,291. As noted therein, no prior purification of the α-fluoronitrimine is required. The hydrolysis reaction is essentially quantitative.

This invention is now illustrated by the following examples of certain preferred embodiments thereof, wherein all the parts, proportions, and percentages are by weight, unless otherwise indicated.

EXAMPLE 1

Reaction of NOBF$_4$ and NOF with 3β,16α,17α,21-tetrahydroxy-5-pregnen-20-one 3,21-diacetate 16,17-acetonide

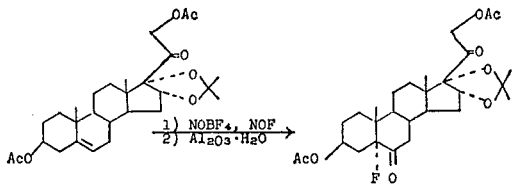

A solution of 50 g. (0.012 mole) of 3β,16α,17α,21-tetrahydroxy-5-pregnen-20-one 3,21-diacetate 16,17-acetonide in 400 ml. of methylene chloride was added slowly (over 1.5 hours) to a cooled (−5 to 0° C.) solution of 34 g. (0.29 mole) of nitrosyl tetrafluoroborate in 600 ml. of glyme. At the same time, 33 g. (0.68 mole) of gaseous nitrosyl fluoride was streamed in over 75 minutes. The reaction mixture was stirred at 0° C. overnight, then poured into brine, extracted with methylene chloride and concentrated. Chromatography on Grade III alumina and elution with benzene gave 39 g. (71%) of 5α-fluoro-3β, 16α,17α,21-tetra-hydroxypregna-6,20-dione 3,21-diacetate 16,17-acetonide, M.P. 227–230° C. [shown to be pure by thin-layer chromatography using silica gel plates and three (multiple) developments in 2% ethyl acetate-methylene chloride].

An additional 19 g. of mostly starting material was obtained which could be purified by further chromatography. This indicates an 80% conversion of starting material and corresponding yield of 88% of product.

When the starting material of Example 1 was treated with nitrosyl fluoride, in the absence of nitrosyl tetrafluoroborate but in the presence of sodium fluoride, a 32.5% yield of the product was obtained after hydrolysis with hydrated alumina.

Reaction of the starting material of Example 1 with nitrosyl tetrafluoroborate, in the absence of nitrosyl fluoride, gave a 36% yield of the expected product.

This experiment was carried out in the following fashion: To a cooled (0° C.) solution of 2 g. (0.017 mole) of nitrosyl tetrafluoroborate in 10 ml. of anhydrous glyme was added a solution of 1 g. (0.002 mole) of 3β,16α,17α, 21-tetrahydroxy-5-pregnen-20-one 3,21 - diacetate 16,17-acetonide in 10 ml. of methylene chloride. The addition required 15 minutes. The reaction mixture was allowed to warm to 25° C. and was stirred for 3.5 hours. It was then poured into brine (saturated NaCl solution) and extracted with methylene chloride. The organic solution was washed well with brine, then concentrated to an oil and twice chromatographed on 30 g. of alumina III, with benzene as eluting solvent, to give 390 mg. (36%) of white crystalline material. After recrystallization from an acetone-benzene mixture, the product melted at 229–230° C.

EXAMPLE 2

Reaction of NOBF$_4$ and NOF with 3β,17β-dihydroxy-5-estrene diacetate

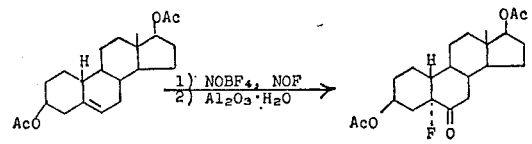

To a cooled (0° C.) mixture of 20.5 g. (0.175 mole) of nitrosyl tetrafluoroborate and 10 g. of sodium fluoride in 500 ml. of anhydrous glyme was added a solution of 50 g. (0.144 mole) of 3β,17β-dihydroxy-5-estrene diacetate in 300 ml. of glyme. At the same time, gaseous nitrosyl fluoride was introduced until 20 g. (0.41 mole) had been added. Both additions required 90 minutes. The reaction was stirred for an additional hour at 0° C. then poured into water. The precipitated solid was filtered and taken up in methylene chloride, and the solution was washed with saturated bicarbonate solution, water, and brine and finally dried (MgSO$_4$). Evaporation gave a yellow oil which was chromatographed on 1.3 kg. of Grade III alumina, eluted with benzene-hexane mixtures and pure benzene, to yield 9.8 g. of starting material and 32 g. of crude product (73% yield). Rechromatographing and recrystallization from acetone-hexane gave 25 g. (63%) of refined product, which was identified as 5α-fluoro-3β, 17β-dihydroxyestran-6-one diacetate by comparison of infrared spectra and thin-layer chromatogram retention times (R$_f$ values) with an authentic sample.

When nitrosyl fluoride alone was used, the yield was only 35%.

EXAMPLE 3

Reaction of NOBF$_4$ and NOF with 17β-acetoxy-3-fluoro-2-androstene

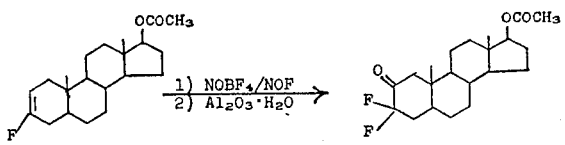

Nitrosyl fluoride was bubbled into a cooled solution of 5.0 g. of 17β-acetoxy-3-fluoro-2-androstene and 1.0 g. of nitrosyl tetrafluoroborate in 300 ml. of anhydrous glyme until the solution was saturated with nitrosyl fluoride (about 20 minutes). The solution was stirred at 0° C. for 3 hours and poured into water, and the mixture was extracted with chloroform. The chloroform extract was washed with saturated aqueous sodium bicarbonate, water, and brine, dried over anhydrous magnesium sulfate, and evaporated to give a blue oil. Chromatography on hydrated alumina, with elution by benzene and hexane, gave 2.0 g. (44%) of 17β-acetoxy-3,3-difluoro-2-androstaneone, which was shown to be pure by thin-layer chromatography.

When the reaction was carried out with nitrosyl fluoride alone, the yield was 24%.

The embodiments of the invention in which an exclusive property or privilege is claimed are defined as follows:

1. A process for the preparation of a steroid α-fluoronitrimine, said process comprising the step of contacting a steroid compound selected from the group consisting of:
   (a) a 2-estrene, 5-estrene, 2-androstene, 9(11)-androstene, 16-estrene, 16-androstene, 13β-ethyl-5-gonene, 5-pregnene, and 9(11)-pregnene; and
   (b) a derivative of a steroid of paragraph (a), above, carrying at least one substituent selected from the group lower alkyl, lower alkynyl, ketone, ether, and ester;
      said substituent being attached to either a ring carbon or an exocyclic carbon;
      with nitrosyl tetrafluoroborate at a temperature of −30° to +60° C. in an aprotic solvent for a period of about 3–240 hours, nitrosyl tetrafluoroborate being present in the proportion of about 2–10 moles for each mole of the starting steroid.

2. The process of claim 1, wherein the reaction temperature is within the range of about 0°–25° C., and the reaction time is about 4–24 hours.

3. A process for the preparation of a steroid α-fluoronitrimine, said process comprising the step of contacting a steroid compound selected from the group consisting of:
   (a) a 2-estrene, 5-estrene, 16-estrene, 2-androstene, 13β-ethyl-5-gonene, 9(11)-androstene, 16-androstene, 5-pregnene, and 9(11)-pregnene; and
   (b) a derivative of a steroid of paragraph (a), above, carrying at least one substituent selected from the group lower alkyl, lower alkynyl, ketone, ether, and ester;
      said substituent being attached to either a ring carbon or an exocyclic carbon;
      with nitrosyl fluoride and nitrosyl tetrafluoroborate at a temperature of −30 to +60° C. in an aprotic solvent for a period of about 3–240 hours;
      nitrosyl tetrafluoroborate being present in the proportion of about 0.1–3 moles, and nitrosyl fluoride being present in the proportion of about 2–8 moles for each mole of the starting steroid.

4. The process of claim 3, wherein the reaction temperature is within the range of about 0–25° C., and the reaction time is about 4–24 hours.

5. The process of claim 3, wherein the molar proportion of nitrosyl tetrafluoroborate is about 0.5–3 moles for each mole of the starting steroid.

6. The process of claim 3, wherein the starting nitrosyl tetrafluoroborate is made in situ from nitrosyl fluoride and boron trifluoride.

References Cited
UNITED STATES PATENTS 3,219,673 11/1965 Boswell.
3,320,921 5/1967 Andreades.

ELBERT L. ROBERTS, Primary Examiner

U.S. Cl. X.R.

260—239.55 D, 397.3, 397.4, 397.45, 397.5

UNITED STATES PATENT OFFICE
CERTIFICATE OF CORRECTION

Patent No. 3,641,006     Dated February 8, 1972

Inventor(s) William Charles Ripka

It is certified that error appears in the above-identified patent and that said Letters Patent are hereby corrected as shown below:

Col. 2, line 41 " 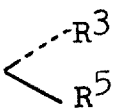 " should be -- 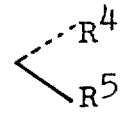 --

Col. 5, line 70 - "0.012" should be -- 0.102 --.

Signed and sealed this 29th day of August 1972.

(SEAL)
Attest:

EDWARD M. FLETCHER, JR.
Attesting Officer

ROBERT GOTTSCHALK
Commissioner of Patents